United States Patent
Hu et al.

(10) Patent No.: US 7,336,781 B2
(45) Date of Patent: Feb. 26, 2008

(54) LATCHING ASSEMBLY FOR A REMOVABLE COVER OF A PORTABLE ELECTRONIC DEVICE

(75) Inventors: Lin Hu, Shenzhen (CN); Chia-Hua Chen, Tu-Cheng (TW)

(73) Assignees: Shenzhen Futaihong Precision Industrial Co., Ltd., BaoAn District, Shenzhen, Guangdong Province (CN); Sutech Trading Lilmited, Road Town, Tortola (VG)

( * ) Notice: Subject to any disclaimer, the term of this patent is extended or adjusted under 35 U.S.C. 154(b) by 587 days.

(21) Appl. No.: 11/021,264

(22) Filed: Dec. 23, 2004

(65) Prior Publication Data
US 2005/0271200 A1 Dec. 8, 2005

(30) Foreign Application Priority Data
Feb. 6, 2004 (TW) .............................. 93201661 U

(51) Int. Cl.
*H04M 9/00* (2006.01)
*H04M 1/00* (2006.01)

(52) U.S. Cl. ............................ 379/433.11; 379/428.01; 379/447

(58) Field of Classification Search ........... 379/433.11, 379/428.01, 447; 455/575.1, 575.8, 90.3, 455/556.2
See application file for complete search history.

(56) References Cited

U.S. PATENT DOCUMENTS

| 5,848,152 | A | 12/1998 | Slipy et al. ................. 379/433 |
| 5,955,700 | A * | 9/1999 | Slipy et al. ................... 174/50 |
| 6,913,297 | B2 * | 7/2005 | Jackson et al. ............. 292/196 |
| 7,002,073 | B2 * | 2/2006 | Lai et al. ....................... 174/50 |
| 7,149,559 | B2 * | 12/2006 | Qin et al. ................. 455/575.8 |
| 7,209,363 | B2 * | 4/2007 | Liu et al. .................... 361/801 |
| 2004/0266498 | A1 * | 12/2004 | Qin et al. ................ 455/575.1 |
| 2005/0009588 | A1 * | 1/2005 | Qin et al. ................ 455/575.8 |
| 2005/0136995 | A1 * | 6/2005 | Robertson, Jr. .......... 455/575.1 |

* cited by examiner

*Primary Examiner*—Curtis Kuntz
*Assistant Examiner*—Phylesha L Dabney
(74) *Attorney, Agent, or Firm*—Morris Manning Martin LLP; Tim Tingkang Xia, Esq.

(57) ABSTRACT

A latching assembly includes a removable panel (1), a knob (2), a sliding latch (3), and a base cover (5). The removable panel includes a mounting hole (12), a depression portion (13), and a plurality of catches (17). The knob includes a slanted protuberance (22), and the knob mates in the mounting hole. The sliding latch includes a head portion (32), a slanted portion (38), and a spring arm (34). The base cover includes a slot (51) matingly receiving the head portion, a plurality of catch slots (54) matingly receiving the catches, and a board (53). When the knob is pressed, the slanted protuberance engages with the slanted portion and the spring arm can move in the depression portion. As a result, the removable panel can be fixed on the base cover or released from the base cover easily.

14 Claims, 7 Drawing Sheets

LATCHING ASSEMBLY FOR A REMOVABLE COVER OF A PORTABLE ELECTRONIC DEVICE

BACKGROUND OF THE INVENTION

1. Field of the Invention

The present invention generally relates to portable electronic devices having removable panels, and more particularly to a latching assembly for detachably securing a removable panel to a portable electronic device.

2. Prior Art

Portable electronic devices, such as mobile phones and personal digital assistants, have become widely accepted around the world. The aesthetic appearance of individual portable electronic devices has become an important requirement of many consumers. Consumers desire different appearances to satisfy their personal tastes and preferences. Thus portable electronic devices with changeable panels are especially popular.

A conventional communication device enclosure with a changeable panel is described in U.S. Pat. No. 5,848,152. The communication device includes a housing and a panel. One or more tabs extend from a periphery of the panel, and one or more slots corresponding to the tabs are defined in a periphery of the housing. Referring to FIG. 7, a latch pin 202 extends from an inner surface of the panel, and a latch keeper 204 is defined in a rear of the housing. A first aperture 206 and a second aperture 208 are defined in the latch keeper 204, with the apertures 206, 208 being in communication with each other. When the latch pin 202 is in the first aperture 206, the panel can be released from the housing, and when the latch pin 202 is in the second aperture 208, the panel is locked on the housing. The latch keeper 204 is forcibly slid using a special tool. In assembly, the tabs of the panel are inserted into the slots of the housing, the latch pin 202 is inserted into the first aperture 206 of the latch keeper 204, and then the latch keeper 204 is slid so that the latch pin 202 enters the second aperture 208 and thereby locks the panel on the housing. In disassembly, the latch keeper 204 is slid so that the latch pin 202 enters the first aperture 206, and then the tabs of the panel are disengaged from the slots of the housing. The panel is thus removed from the housing.

However, a user needs a special tool in order to release or to lock the panel. It is not convenient to change the panel. Moreover, the latch pin is easily disengaged from the locked position when the mobile phone is jarred or dropped.

SUMMARY OF THE INVENTION

Accordingly, an object of the present invention is to provide a latching assembly for a removable panel of a portable electronic device, the latching assembly having a relatively simple configuration which can firmly attach the removable panel to a base cover of the portable electronic device and allow easy detachment of the removable panel from the base cover.

To achieve the above-mentioned object, in an exemplary embodiment of the present invention, a latching assembly comprises a removable panel, a knob, a sliding latch and a base cover. The removable panel defines a mounting hole, a depression portion and a plurality of catches therein. The knob comprises a slanted protuberance, and the knob mates in the mounting hole. The sliding latch comprises a head portion, a slanted portion and a spring arm. The base cover comprises a slot matingly receiving the head portion of the sliding latch, a plurality of catch slots matingly receiving the catches of removable panel, and a board. When the knob is pressed, the slanted protuberance engages with the slanted portion and the spring arm can move in the depression portion. As a result, the removable panel can be fixed on the base cover or be released from the base cover easily.

Other objects, advantages and novel features of the invention will become more apparent from the following detailed description when taken in conjunction with the accompanying drawings, in which:

DETAILED DESCRIPTION OF THE INVENTION

Figure 1:
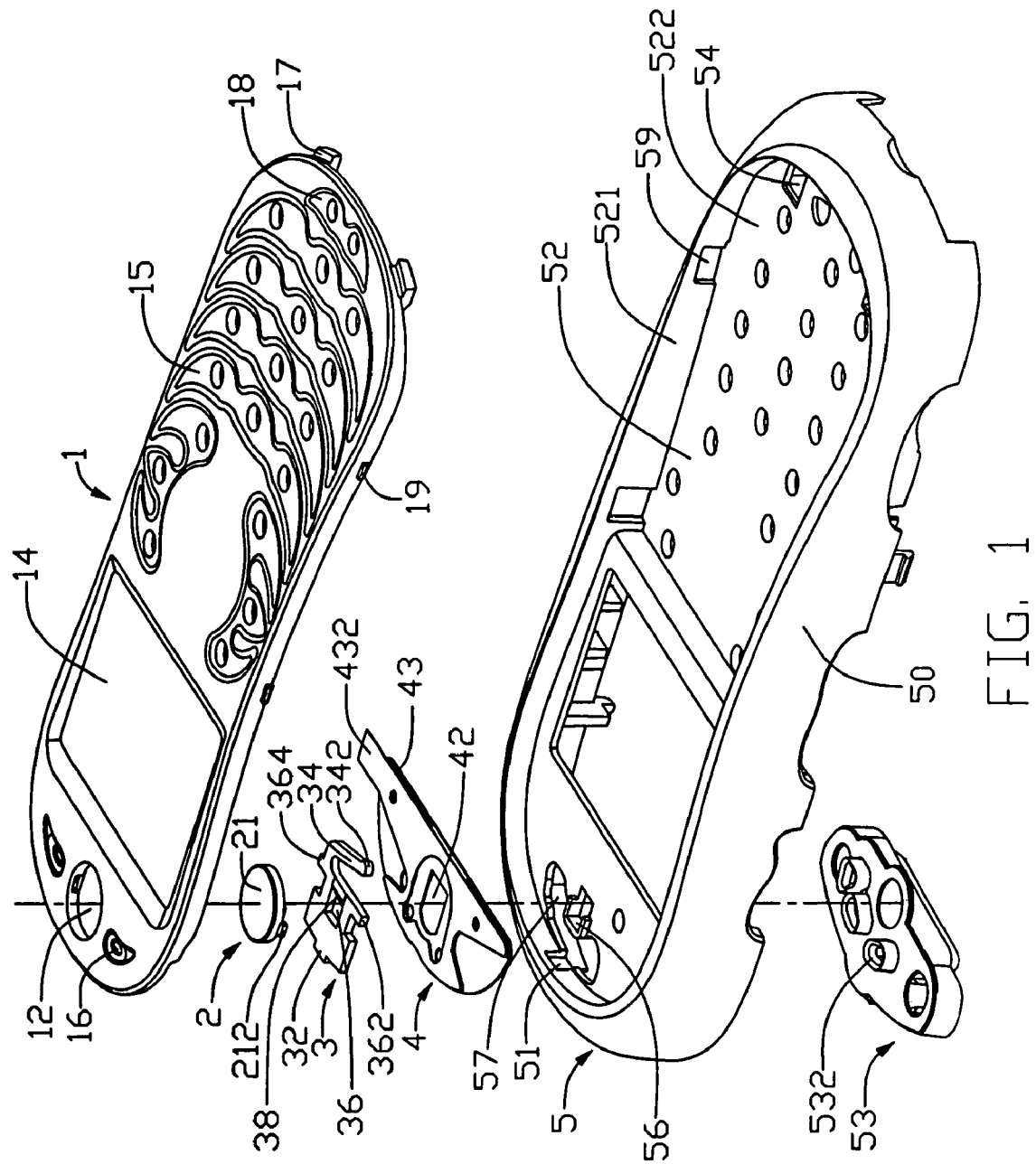
FIG. 1 is an exploded, isometric view of an enclosure for a mobile phone incorporating a latching assembly in accordance with the present invention.
Figure 2:
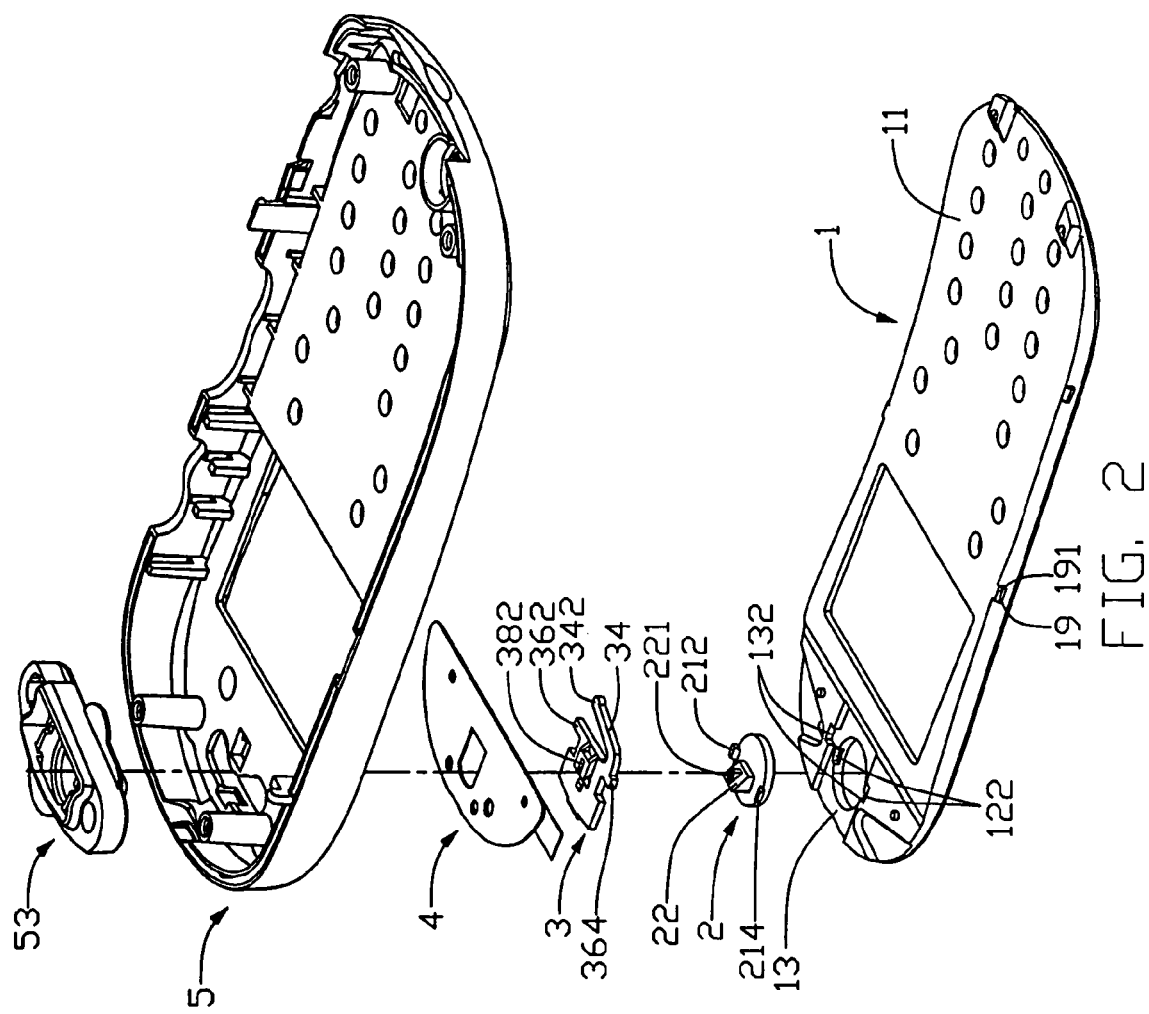
FIG. 2 is an inverted view of FIG. 1.
Figure 3:
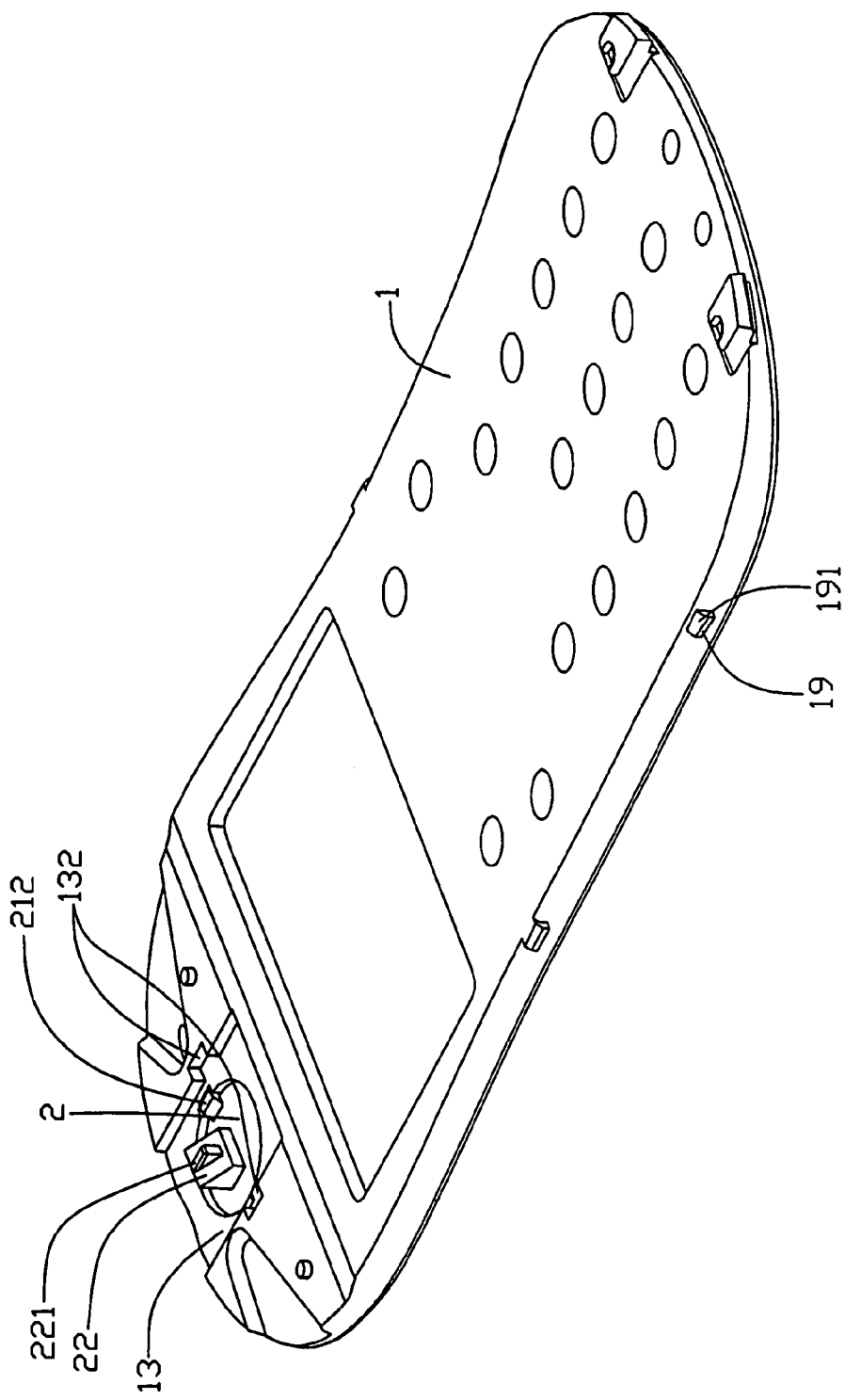
FIG. 3 is an enlarged, assembled view of a removable panel and a knob of the latching assembly shown in FIG. 2.
Figure 4:
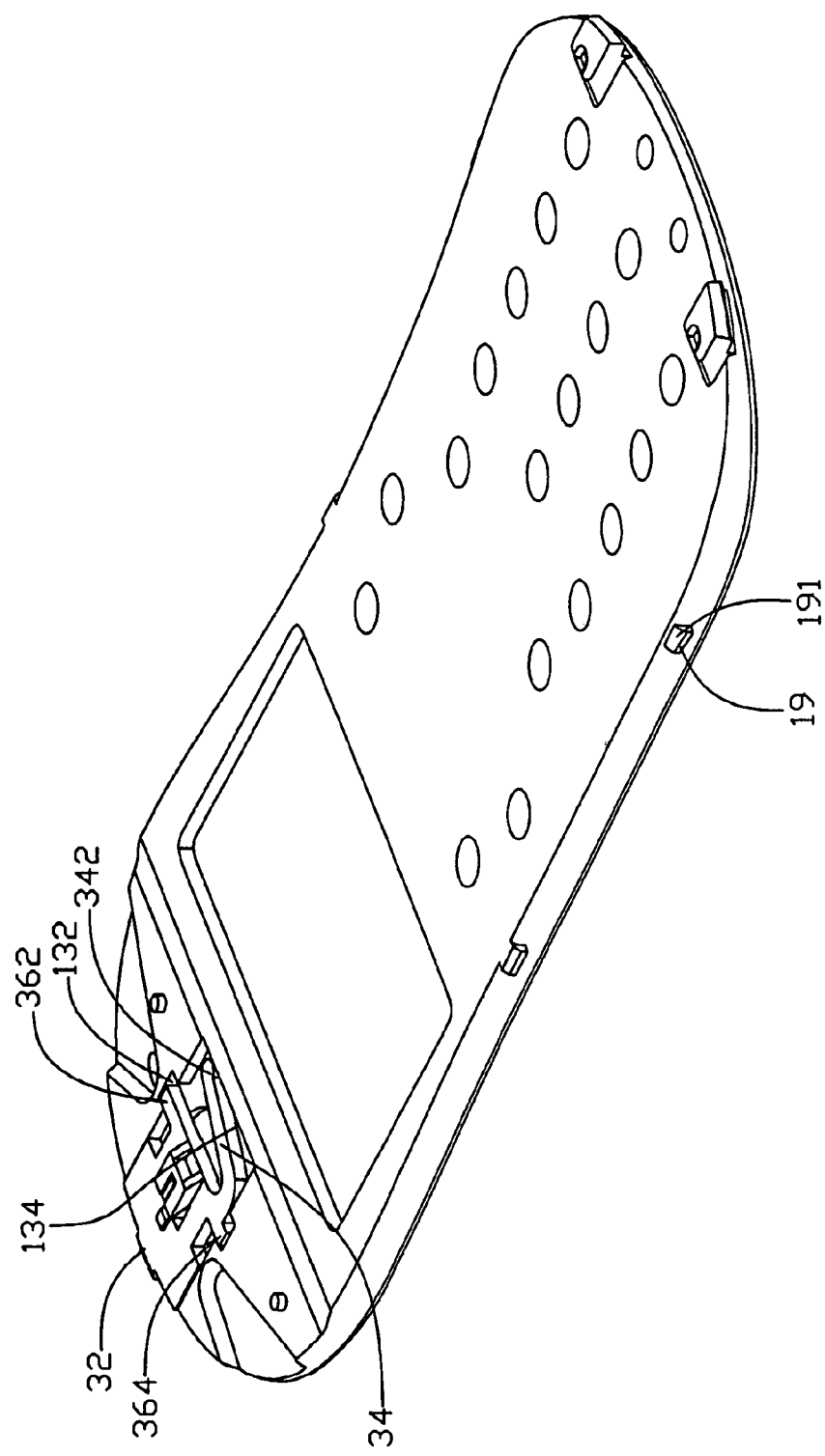
FIG. 4 is similar to FIG. 3, but also showing a sliding latch attached to the removable panel and the knob.
Figure 5:
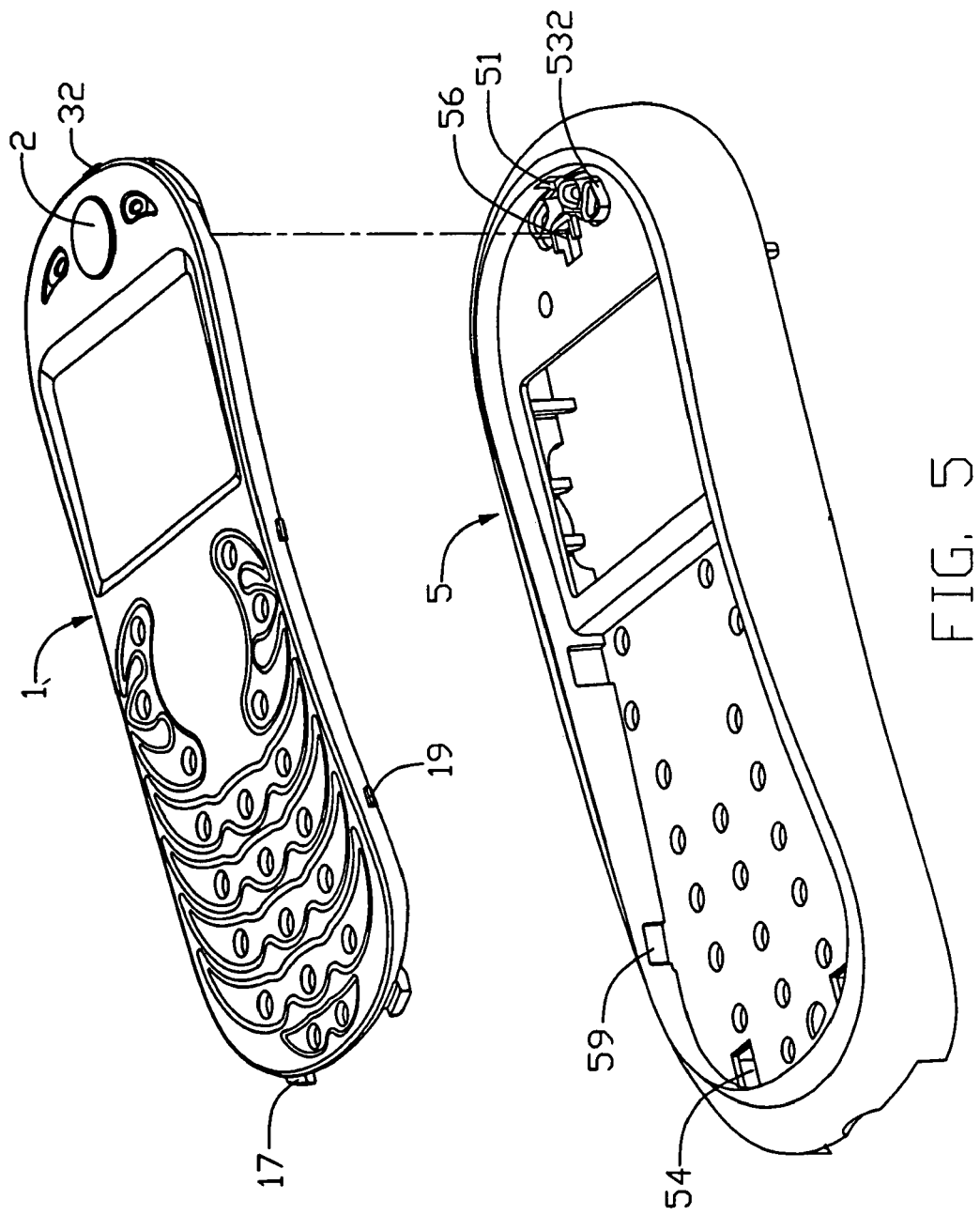
FIG. 5 is a partly assembled view of FIG. 1, but viewed from another aspect.
Figure 6:
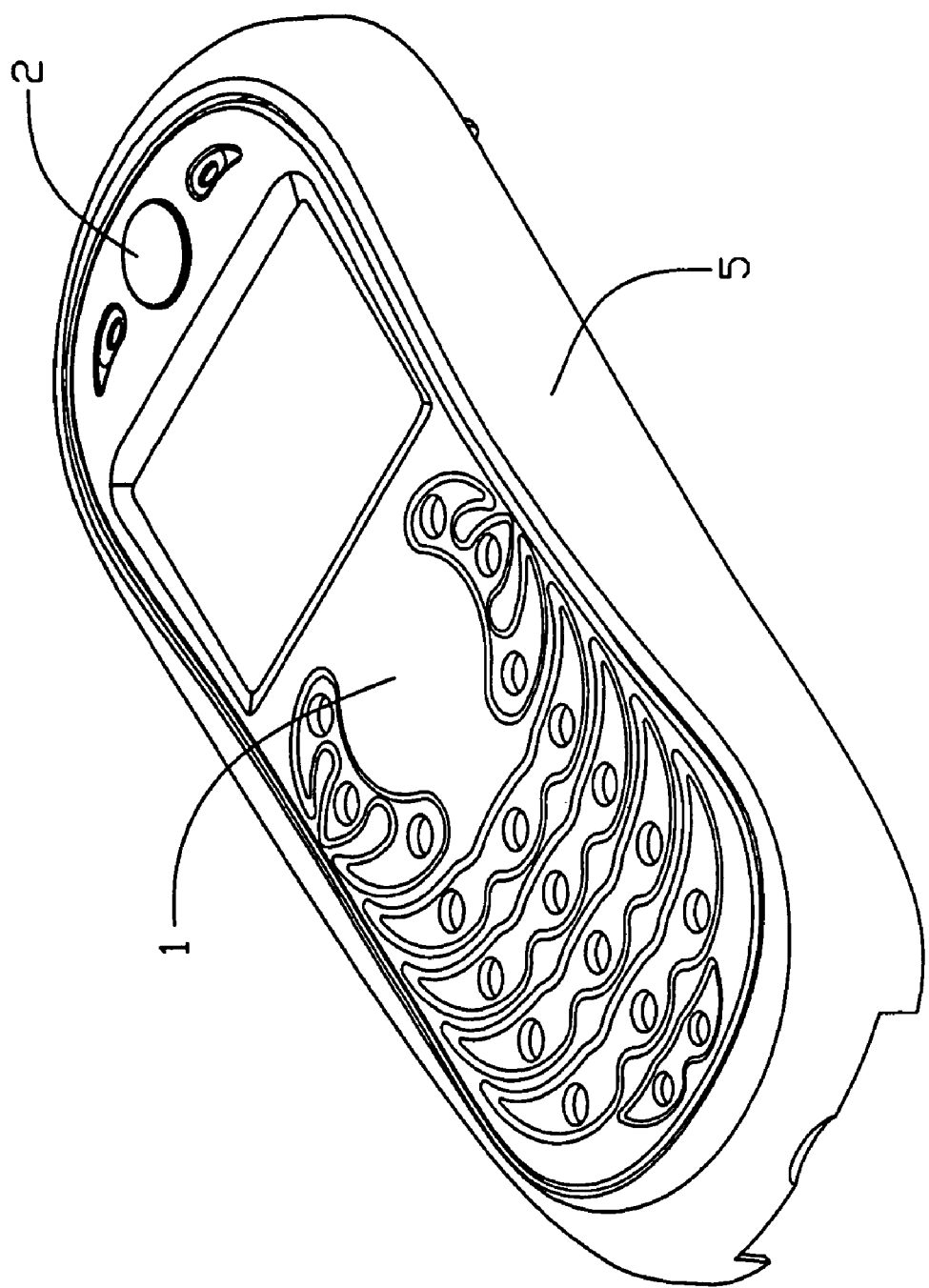
FIG. 6 is a fully assembled view of FIG. 5.
Figure 7:
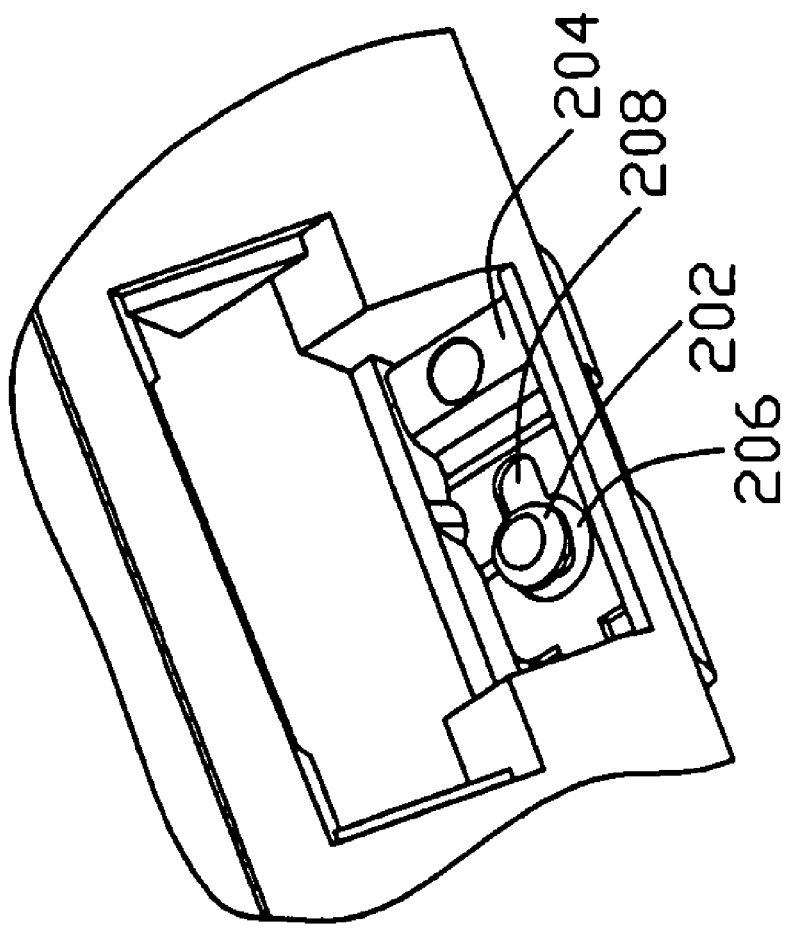
FIG. 7 is an isometric view of part of an end of an enclosure for a mobile phone of the prior art, showing a latch pin and a latch keeper thereof.

A portable electronic device in accordance with the present invention pertains to mobile phones, PDAs (Personal Digital Assistants), and like apparatuses. The present invention will be described as being embodied in a mobile phone as an illustrative example, with reference to the drawings, as follows:

Referring to FIGS. 1-2, an enclosure for a mobile phone includes a removable panel 1, a knob 2, a sliding latch 3, a latching plate 4 and a base cover 5. The knob 2 and the sliding latch 3 are mounted in the removable panel 1 by the latching plate 4. The removable panel 1 is attached on the base cover 5 and firmly retained thereon by the knob 2 and the sliding latch 3.

The removable panel 1 includes a mounting hole 12 located in a first end thereof, a depression portion 13 located at an inner surface 11 thereof and generally surrounding the mounting hole 12, a pair of detents 19 located on each of opposite long side edges thereof, and two catches 17 extending from a second end thereof opposite to the first end. The removable panel 1 further includes a display window 14, a plurality of keyholes 15, a plurality of speaker apertures 16, and a plurality of microphone apertures 18. Two symmetrically opposite first cutouts 122 are defined in lateral sides of the depression portion 13 respectively, in communication with the mounting hole 12. Two symmetrically opposite second cutouts 132 are defined in the inner surface 11 at opposite sides of the depression portion 13 respectively.

The knob 2 comprises a button 21 which has a flat top. A slanted protuberance 22 extends from a bottom of the button 21. A vertical protuberance 221 extends downwardly from a middle of the slanted protuberance 22. Two symmetrically opposite horizontal protuberances 212, 214 extend outwardly from an underside of the button 21. The horizontal protuberances 212, 214 are adapted to engage in the first cutouts 122 and thereby lock the knob 2 into the mounting hole 12.

The sliding latch 3 includes a head portion 32 at a first end thereof, a spring arm 34 at an opposite second end thereof, and a hole 36 between the head portion 32 and the spring arm 34. The spring arm 34 includes an enlarged end 342. The hole 36 is bounded on one side by a slanted portion 38, which corresponds to the slanted protuberance 22. A slanted slot 382 is defined in a middle of the slanted portion 38, corresponding to the vertical protuberance 221. Two symmetrically opposite shoulders 362, 364 extend from lateral sides of the sliding latch 3 respectively. The shoulders 362, 364 are adapted to slide in the second cutouts 132.

The latching plate 4 is made of a hard material such as a hard plastic or metal. A bore 42 is defined through a middle of the latching plate 4, through which the slanted portion 38 can extend. An adhesive portion 43 is located on a top face of the latching plate 4. The adhesive portion 43 is covered by a protective layer 432, which can be peeled off from the adhesive portion 43.

The base cover 5 defines a receiving space 52 in an upper portion thereof, for receiving the removable panel 1. The receiving space 52 is bounded by a peripheral sidewall 521 and a bottom wall 522. A plurality of detent slots 59 is defined in the sidewall 521, corresponding to the detents 19. Two catch slots 54 are defined in the bottom wall 522, corresponding to the catches 17. A slot 51 is defined in a first end of the sidewall 521. A socket 56 is formed at the bottom wall 522 near the slot 51. A receiving hole 57 is defined through the bottom wall 522 between the slot 51 and the socket 56. A board 53 made of elastic material is provided. Two seats 532 extend from a top face of the board 53. The seats 532 can extend up through the receiving hole 57 so that they are exposed above the bottom wall 522.

Referring to FIGS. 1-6, in assembly, firstly, the knob 2 is inserted into the mounting hole 12, with the horizontal protuberances 212 being engaged in the first cutouts 122. Secondly, the sliding latch 3 is pushed onto the depression portion 13. The protuberance 221 is received in the slanted slot 382, and the enlarged end 342 resiliently abuts a transverse wall 134 adjacent the depression portion 13. The shoulders 362, 364 are received in the second cutouts 132, and can slide therein in unison in opposite first and second directions. The head portion 32 is exposed out beyond the first end of the removable panel 1. Thirdly, the protective layer 432 is peeled off the adhesive portion 43. The latching plate 4 is adhered to the inner surface of the removable panel 1 at the first end thereof, with the slanted portion 38 overlying the bore 42. Fourthly, the board 53 is pushed onto an underside of the base cover 5, with the seats 532 extending up through the receiving hole 57 so that they are exposed above the bottom wall 522. The board 53 is fixed to the base cover 5 by a screw (not shown) and a bolt (not shown).

Finally, the removable panel 1 is put into the receiving space 52, with the catches 17 being received in the catch slots 54 and the detents 19 being received in the detent slots 59. Then the first end of the removable panel 1 is pressed so that the head portion 32 is no longer exposed out beyond the first end of the removable panel 1, and can therefore moves downwardly opposite the first end of the sidewall 521 until it reaches the slot 51, and simultaneously the spring arm 34 is compressed. The spring arm 34 decompresses and drives the sliding latch 3 back toward the first end of the removable panel 1, so that the head portion 32 is engaged in the slot 51. In this position, the slanted portion 38 is received in the socket 56, and the seats 532 are compressed by the latching plate 4, and the enlarged end 342 resiliently abuts the transverse wall 134 as before. The removable panel 1 is thus securely attached to the base cover 5.

In detaching the removable panel 1 from the base cover 5, the button 21 is pressed, and the slanted protuberance 22 rides along the slanted portion 38 and drives the sliding latch 3 toward the second end of the removable panel 1. The head portion 32 is released from the slot 51, and the seats 532 decompress and drive the latching plate 4 upwardly. The removable panel 1 is then easily released from the base cover 5.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A latching assembly for a portable electronic device, comprising:
    a removable panel comprising a mounting hole, a depression portion and a plurality of catches;
    a knob comprising a slanted protuberance, the knob mating in the mounting hole;
    a sliding latch comprising a head portion, a slanted portion, and a spring arm; and
    a base cover, comprising a slot matingly receiving the head portion of the sliding latch, a plurality of catch slots matingly receiving the catches of the removable panel, and a board;
    wherein when the knob is pressed, the slanted protuberance engages with the slanted portion and the spring arm can move in the depression portion.

2. The latching assembly as claimed in claim 1, wherein the removable panel further comprises a display window, a plurality of keyholes, a plurality of speaker apertures, and a plurality of microphone apertures.

3. The latching assembly as claimed in claim 2, wherein opposite lateral sides of the depression portion define two symmetrical first cutouts respectively, the first cutouts being in communication with the mounting hole.

4. The latching assembly as claimed in claim 3, wherein inner surfaces at opposite sides of the depression portion define two symmetrical second cutouts respectively.

5. The latching assembly as claimed in claim 4, wherein the knob further comprises two symmetrical horizontal protuberances, for engaging in the first cutouts and thereby locking the knob in the mounting hole.

6. The latching assembly as claimed in claim 5, wherein a vertical protuberance extends downwardly from the slanted protuberance.

7. The latching assembly as claimed in claim 6, wherein an adhesive portion is located on a top face of the latching plate, for adhering the latching plate to the removable panel.

8. The latching assembly as claimed in claim 7, wherein at least one elastic seat extends from a top of the board.

9. The latching assembly as claimed in claim 8, wherein a plurality of detents is located on each of opposite long side edges of the removable panel, and said catches extending from an end of the removable panel.

10. A portable electronic device, comprising:
    a removable panel;
    a knob attachable to said removable panel and movable relative to said removable panel along a first direction perpendicular to said removable panel;

a sliding latch attachable to said removable panel and movable resiliently relative to said removable panel along a second direction parallel to said removable panel; and an enclosure of said portable electronic device used to allow said removable panel removably attachable thereto, engagement of said sliding latch and said enclosure resulting in fixed attachment of said removable panel to said enclosure and movement of said knob along said first direction leading to movement of said sliding latch along said second direction and disengagement of said sliding latch and said enclosure.

11. The portable electronic device as claimed in claim 10, further comprising at least one elastic seat extends next to said knob to resiliently resist said movement of said knob.

12. The portable electronic device as claimed in claim 10, wherein said sliding latch comprises a slanted portion to engage with said knob and lead to said movement of said sliding latch based on said movement of said knob.

13. A method of assembling a removable panel with an enclosure of a portable electronic device, comprising the steps of:

providing a movable knob relative to said removable panel along a vertical direction to said removable panel;

providing an attachably movable sliding latch relative to said removable panel between a first position thereof and a second position thereof where said sliding latch engages with said enclosure in order to assemble said removable panel with said enclosure;

providing a resilient force to urge said sliding latch to move from said second position to said first position; and allowing said knob movably reachable to said sliding latch to control applying of said resilient force on said sliding latch.

14. The method as claimed in claim 13, further comprising the step of providing another resilient force to urge said knob moving along said vertical direction.

* * * * *